July 24, 1951  E. W. GOLDBERG  2,561,856
FILM SPLICING DEVICE
Filed May 19, 1948  2 Sheets-Sheet 1
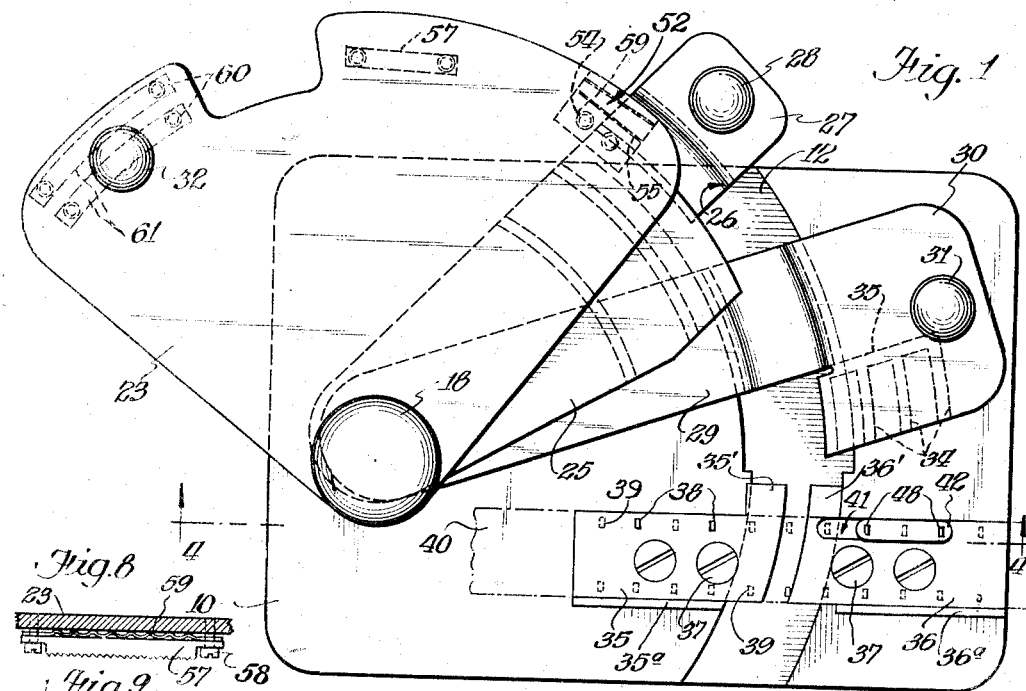
Inventor:
Ernest W. Goldberg
By: Henry Hech
Attorney.

July 24, 1951  E. W. GOLDBERG  2,561,856
FILM SPLICING DEVICE
Filed May 19, 1948  2 Sheets-Sheet 2
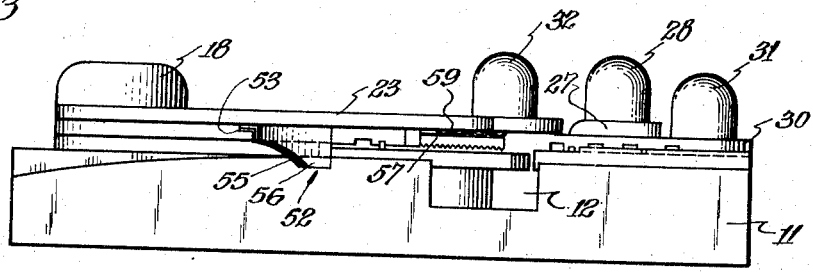
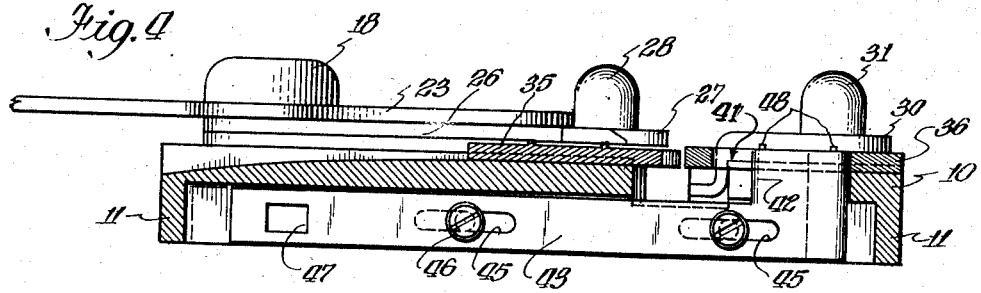
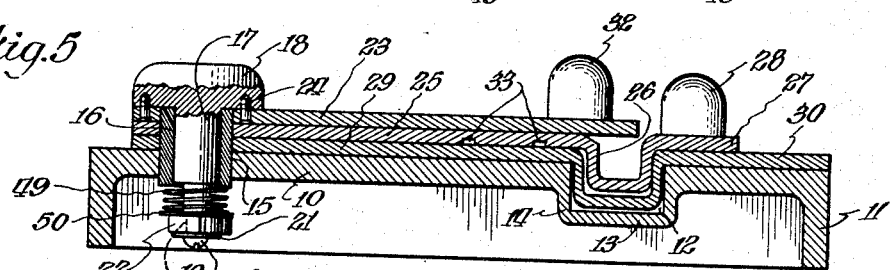
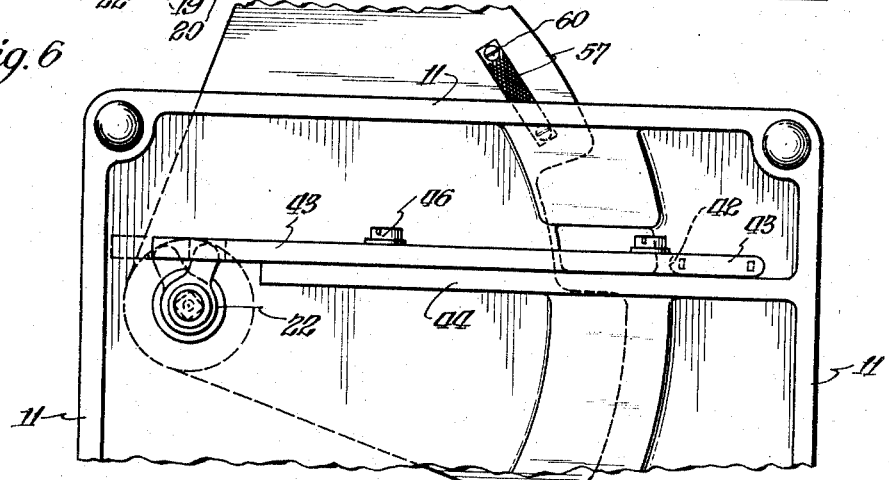
Inventor:
Ernest W. Goldberg
By: Henry Hesh
Attorney.

Patented July 24, 1951

2,561,856

UNITED STATES PATENT OFFICE 2,561,856

FILM SPLICING DEVICE

Ernest W. Goldberg, Chicago, Ill.

Application May 19, 1948, Serial No. 27,915

14 Claims. (Cl. 154—42.1)

The invention relates to film splicing devices wherein a strip of film is spliced to another strip of film.

The splicing of film becomes frequently necessary when two ends of a film are to be secured together or where in a continuous film a portion thereof must be eliminated and the cut ends are to be secured together.

In order to effect a convenient and efficient manner of splicing films various devices have been proposed. These devices are, however, very complicated and hence expensive and in addition do not possess the accuracy and efficiency required for such purposes.

It is, therefore, an object of the invention to provide a film splicing device wherein the splicing of films is carried out in an exceedingly accurate, efficient and yet inexpensive manner.

It is a further object to provide a device wherein a film strip is clamped down preparatory to being cut at a predetermined point, scraped at one end to remove the emulsion, glued at the scraped portion and the untreated end is shifted to overlap the glued end.

It is a further object of the invention to provide a single means for cutting, scraping and clamping down the film.

Another object is the provision of means for affording visual examination of the scraped film area while the scraping is carried out.

A still further object constitutes the provision of individual clamping members to secure the ends of the film strip which clamping members and the cutting means are movable about a common pivot so that no play exists in actuating the parts in order to effect splicing.

It is a further object to provide scraping means which will remove the emulsion on the film but leave the film proper intact.

It is a further object to provide a device wherein the portions of the film adjacent to the portion to be cut are supported in different horizontal planes so that after cutting the higher film portion is shifted onto the lower film portion to overlap the same.

It is also an object of the invention to provide certain details of construction and arrangement of parts tending to enhance the utility and efficiency of a device of the character specified.

With these and other important objects in view which will become apparent from a disclosure of the invention, the latter comprises the means described in the following specification, particularly pointed out in the claims forming a part thereof, and illustrated in the accompanying drawings, in which Fig. 1 is a top plan view of the device constructed in accordance with my invention with parts turned in idle or inoperative position.

Fig. 2 is a top plan view showing the parts after all operations are completed and preparatory to shifting one film end onto the other in overlapping relation.

Fig. 3 is a side elevational view of the device.

Fig. 4 is a section on the line 4—4 of Fig. 1.

Fig. 5 is a section on the line 5—5 of Fig. 2.

Fig. 6 is a fragmentary bottom plan view of the device.

Fig. 7 is a fragmentary view of the cutting plate showing a modification.

Fig. 8 is a detail view of a scraper, and

Fig. 9 is a detail view of a pressure plate.

Referring to the several views in the drawing 10 designates a base plate which preferably, although not necessarily, is of rectangular form and rounded at the corners to enhance its appearance. Along its perimeter the base plate has a downwardly extending flange 11 to act as a support for the plate.

An arcuate groove 12 having a comparatively large radius extends from one side of the plate 10 to the other, the center point of the arc being lateral with respect to the longitudinal axis of the plate. The depth of the groove exceeds the thickness of the plate 10 and the groove at the bottom is closed by a bottom wall 13 and side walls 14.

A large circular opening 15 in the plate 10 (Fig. 5) is lined with a bushing 16 in which is received a round stem 17 forming the extension of knob 18. The stem 17 is reduced in diameter below the plate 10 and terminates at the lower end in a hollow square shank 19. The shank is provided with internal threads to receive a screw 20 whose head engages a washer 21. A dog 22 is fitted on the shank 19 for a purpose hereinafter described.

The knob 18 rests on a sector disk 23 to which it is secured by a pair of screws 24 (Fig. 5).

The sector disk 23 rests on a segmental arm 25 which is formed at the left end as viewed in Fig. 5 with a circular opening for the passage of the bushing 16. The right end of the arm 25 is formed with a narrow extension 26 which is bent to conform to the groove 12 and terminates in a horizontal portion 27 to which is secured a knob 28 for easy manipulation of the arm 25.

The arm 25 rests on an arm 29 which is likewise rotatable about the bushing 16 and is bent at the right end to conform to the groove 12 and continues in a wide horizontal portion 30 provided with a knob 31 for manipulating the arm.

A knob 32 is secured to the sector disk for manipulation thereof.

The underside of arm 25 is provided with two arcuate grooves 33 (Fig. 5) and the underside of the arm portion 30 is provided with four arcuate grooves 34 (Fig. 2) which originate at one side and open into a straight groove 35 running parallel to the side of portion 30 (Fig. 1).

To the plate 10 bearing blocks 35, 36 are secured by screws 37 and extend parallel to the side of the base plate 10. The bearing block 35 is provided with a pair of spaced pins 38 which enter adjacent apertures or perforations 39 of a film strip 40 shown in dash and dotted lines in Fig. 1. The bearing block 36 is cut away at the inner side as at 41 (Fig. 1) to receive the vertical arm 42 of a horizontal bar 43 (Fig. 6) which is in sliding contact with a rib 44 cast on the underside of the plate 10. The bar 43 is provided with a pair of spaced elongated slots 45 through each of which extends a screw 46. A slot 47 is also provided in the bar 43.

The arm 42 is also provided with pins 48, which are adapted to enter adjacent perforations in the film.

The bearing block 35 is slightly lower than the bearing block 36 so that the film strip on the block 36 after cutting may be conveniently shifted onto the film strip overlying the block 35.

The bearing blocks 35, 36 are provided with integral lugs $35^1$ and $36^1$ which form guide lugs and in addition have abutment ledges $35a$ and $36a$ respectively to hold the film strip against lateral displacement in one direction.

In order to regulate the pressure of the sector disk 23 and arms 25 and 29, a spring 49 is interposed between the dog 22 and bushing 16, there being a washer 50 on top of the dog to tension the sector disk, and arms 25 and 29.

The sector disk 23 is provided with a cut-out portion 51 to afford visual inspection of the parts therebelow during rotation of said disk.

To the underside of the disk 23 is secured a cutting device 52 (Figs. 1 and 3) comprising a pair of overlapping plates 53 secured by screws 54 and which are bent downwardly near the perimeter of the disk to provide spaced flanges 55, 56 whose lower edges are somewhat arcuate and formed as cutting edges.

Adjacent the cut-out portion 51 is a scraper plate 57 secured to the underside of disk 23 by screws 58, there being a spring blade 59 interposed to resiliently support the scraper.

The fact that the sector plate rides on the arm 25 prevents the scraper from reaching the film proper and upon proper adjustment of the scraper, only the emulsion of the film can be removed, leaving the film proper intact.

The sector disk is also provided with a pressure plate 60 which is secured thereto by screws 61 and having a spring blade 62 interposed so that after the cement is applied to the scraped film portion and the film strips are in overlapping relation pressure is applied to secure the overlapping film portions together.

In Fig. 7 a slightly modified sector disk 63 is shown which has a cut-out portion 64 somewhat smaller than the cut away portion 51 of disk 23.

The disk 63 is provided with a brush 65 and a cement applicator 66. A pressure plate 67 is also attached to the disk.

In use the parts are arranged as shown in Fig. 1 and a film strip 40 is placed with the pins 38 and 48 entering perforations 39 of the film.

Thereafter the arm 29 by seizing the knob 31 is swung about its pivot until its portion 30 covers the film strip overlying the bearing block 36. Attention is called to the fact that two of the grooves 34 afford clearance for the pins 48. The arm 29 is arrested in such pivotal movement by contact with the bearing blocks. In that position the portion 30 of arm 29 exercises a clamping effect on the film portion overlying the bearing block 36.

Then the arm 25 is turned clockwise as viewed in Fig. 1 by means of the knob 28 until the extension 26 engages the bearing blocks in which position the film portion overlying the block 35 is clamped down to be secured against shifting. The grooves 33 provide clearance for the pins 38.

Attention is called to the fact that the bearing block 35 is slightly lower than the block 36.

Upon rotating the sector disk 23 clockwise the cutting device 52 being guided by the lugs $35^1$ and $36^1$ will cut out a strip of the film and the continued movement will bring the scraper 57 in contact with the film overlying the bearing block 35. Usually it is necessary to reciprocate the disk a few times so that the scraper entirely removes the emulsion.

The cut-out portion 51 of the disk permits visual inspection, without necessitating the removal of parts, while such scraping is carried on.

Then the scraped off film portion is provided with a cement or glue by manual application to the severed end at the lower (left) level in the device of Fig. 1, or automatically by deposit of the cement from applicator 66 (into which the cement has been initially dropped) so that the brush 65, upon return motion of sector 63 will spread the cement. Upon the continued rotation of the disk the dog 22 enters the slot 47 of the slide bar 43 which with its arm 42 and pins 48 causes the film overlying the bearing block 36 to be shifted to the left as viewed in Fig. 4 and since the film overlying block 35 is in a lower level than block 36 the film portions will readily overlap and become glued together so that the splicing of the films is complete.

The extent to which the film is shifted is the length of one picture frame so that the spliced film will offer a continuous series of picture frames as if the film were unitary.

The sector disk and arms rotate about the same pivot where a bushing precludes any looseness or play thereby ensuring accuracy in the cutting and splicing operations.

Since the center of the sector disk is offset with respect to the longitudinal axis, it is evident that the cut through the film will be arcuate instead of linear.

The pressure plate 60 will press the film strips together after gluing to firmly secure the overlapped film portions together.

The film splicing device is not only distinguished by its utility but also by its inexpensiveness and simplicity without, however, sacrificing accuracy.

While the drawings show one embodiment of the invention, numerous changes and alterations may be made without departing from the spirit of the invention.

I, therefore, do not limit myself to the details of construction and arrangement of parts, as shown, but include all revisions, modifications and changes within the scope of the invention, as defined in the appended claims.

I claim:

1. A film splicing device including a support for the film, a member pivotally secured to said support for oscillation parallel to the top thereof, a cutter secured to said member radially of its pivot and operable to cut the film transversely along an arcuate line, a slide on said support engaging the film near said line, and means operably interconnecting said member and said slide for selective movement of the latter by the former in a direction to overlap one of the ends of the cut film with the other cut and thereof responsive to movement of said member a predetermined distance in the direction of cutting operation thereof.

2. A film splicing device including a flat base, means on said base defining a film bed with portions situated at different levels, a plate member pivoted on said base for movement in a plane approximately parallel to the latter and in a direction across said bed, a cutter movable with said plate in a direction across a film in the bed to sever the film along an arcuate line, and mechanism coacting with said plate in a certain range of movement thereof to be operated responsive to the movement of the plate in a direction past the complete film-cutting position to shift one of the severed portions of the film toward the other such that the cut ends overlap, and means removably holding a film in said bed on opposite sides of said arcuate cutting line.

3. A splicer for strip film including a base with a substantially flat top, a member pivoted on said top to move in substantial parallelism therewith, radially-situated cutting means carried on said member, a film bed on said top for positioning a strip of film across the path of travel of said cutting means so that the film may be cut laterally, shiftable means engaging a portion of the film at one side of the cutting line, and a driving connection between said pivoted member and said shiftable means for moving the latter to shift a cut portion of the film toward and onto the other cut portion thereof following continued movement of said pivoted member a determined distance in the direction of its travel beyond the cutting range of movement thereof, and means selectively movable into and out of position onto said film on opposite sides of the path of travel of the cutting means thereacross for releasably holding said film in said bed in both uncut and cut condition.

4. A film splicer including a base, a sector plate pivoted on the base to move in approximate parallelism therewith, cutting means situated radially on the plate and travelling in an arcuate path with the plate, and a film bed positioning a strip of film across said path to be cut laterally by said cutting means in a certain range of movement of said plate.

5. A film splicer in accordance with claim 4 and further characterized by the provision of film scraping means carried on said plate in angularly spaced relation to said cutting means and at substantially the radial distance of the latter from the pivotal axis of the plate for scraping engagement with a cut end of film in said bed responsive to continued travel of said plate beyond said cutting range.

6. A film splicer in accordance with claim 5 and further characterized by the provision of a pair of arcuately extensive radially spaced film hold-down members carried on the plate to follow in said path and to be located each on one side of the approximate center line of the cut effected by said cutting means for the purpose of holding down the cut end regions of the film when the latter are brought together and cemented with the cemented areas in position upon said center line.

7. A film splicer including a base, a sector plate pivoted on the base to move thereover in approximate parallelism with the top thereof, cutting means situated radially on the plate and travelling therewith in an arcuate cutting path, a film bed for positioning a strip of film across said path to have a section of the film cut out of the strip in a certain range of travel of the plate, and a pair of hold-down levers coaxially pivoted with said sector plate and each having hold-down film-engaging parts respectively situated at different radial distances so as to engage said film strip respectively on opposite sides of said cutting path whereby to hold the strip film in said bed in both cut and uncut conditions.

8. A film splicer in accordance with claim 7 and further characterized in that said base top has an arcuate channel coincident with said cutting path across the top and bed, and said hold-down levers each having mutually interfitting offsets depressed to travel in said channel at a depth out of the way of said cutting means, said levers being disposed in overlying interfitted relation in film-holding position as aforesaid.

9. A film splicer in accordance with claim 7 and further characterized by the provision of a shiftable film-engaging device in said bed at one side of said cutting path, and drive mechanism interconnecting said sector plate and said shiftable device for shifting of the latter crosswise of said path to move one cut portion of said film strip toward the other a distance sufficient to overlap the cut ends of the strip, said drive mechanism including a lost-motion means for limiting the shifting action of the sector plate upon said shiftable device to a certain range of movement of the sector plate which is outside of the cutting range of movement thereof.

10. A film splicer in accordance with claim 9 and further characterized by the provision in said film bed of film-supporting surfaces underlying the film in said channel on opposite sides of the cutting path of the cutting means with one film-engaging surface situated at a higher level than the other such that the cut ends of the film are in overlapping planes following shifting of one of the cut pieces by operation of said shiftable device as aforesaid.

11. In a film splicer, a flat base plate, an arcuate channel across the top of said plate, a film bed for positioning a strip of film to lie across said channel, three lever members mounted on a common pivot on said top to travel concentrically of said channel, the lowermost said lever having a depressed part, travel in the bottom region of said channel and a handle part extending radially beyond said channel, an intermediate lever having a depressed offset freely interfittable with said first-mentioned offset to travel in said channel together with a handle part extended radially beyond said channel but of shorter radial length than said handle part of the first lever, and the third lever having a handle part and radially situated cutting means travelling in said channel and freely through the interfitted or separated depressed parts of the first two levers and crosswise of a film in said bed, said third lever being of shorter radial extent than either of the other two levers whereby in all relative positions of the levers said handle parts are exposed for manipulating engagement, said first and second levers each having film hold-down means situated radially thereon to lie respectively on opposite sides of the cutting path of said cutting means whereby to hold the film in said bed in both cut and uncut condition.

12. In a film splicer, in combination, a film bed, a base for the bed, an arcuate passage in the base and underlying said bed, a sector-like plate pivoted on the base concentrically with the arc of said passage, and film cutting means carried on said plate at a radial position to depend into said passage and move crosswise through a strip of film in said bed.

13. The combination of claim 12 which further includes a shiftable film-engaging member situated in said bed on one side of said passage, an arm connected with said shiftable member and extending in the base normally to the pivotal axis of said plate, and dog means movable with said plate radially about the pivotal axis thereof and engageable in a lost-motion connection with said arm for shifting said shiftable member in a direction to move a severed part of film engaged thereby toward the other severed part of the film in said bed responsive to movement of the plate in a certain range of its travel exclusive of its range of travel in cutting operation of said cutting means.

14. In a motion-picture film splicer, the combination including a base, a lever element pivoted on said base for arcuate movement in a plane close to and parallel with an upper surface on said base, a film bed extending along a line across an arc of travel of said lever element to position a strip of film lengthwise on said line, the latter lying at one side of, and approximately parallel to, a radius through the pivotal center for said lever element, and a cutting means carried by said lever element to move angularly across said line and the film in said bed in such manner that the cut across the film is arcuate and the arc intercepts any longitudinal axis through the film at an angle different from 90° or any multiple thereof, for the purpose of making a splicing cut which is arcuate and which sweeps across the film on the bias, whereby the image of the splice in motion picture projection sweeps into view on a bias and not rectilinearly crosswise of the film.

ERNEST W. GOLDBERG.

REFERENCES CITED

The following references are of record in the file of this patent:

UNITED STATES PATENTS

| Number | Name | Date |
| --- | --- | --- |
| 1,175,449 | Hirsch | Mar. 14, 1916 |
| 1,489,261 | Malizia | Apr. 8, 1924 |
| 2,126,298 | Wittel | Aug. 9, 1938 |
| 2,328,447 | Geyer | Aug. 31, 1943 |
| 2,460,619 | Briskin | Feb. 1, 1949 |